Figure 1:
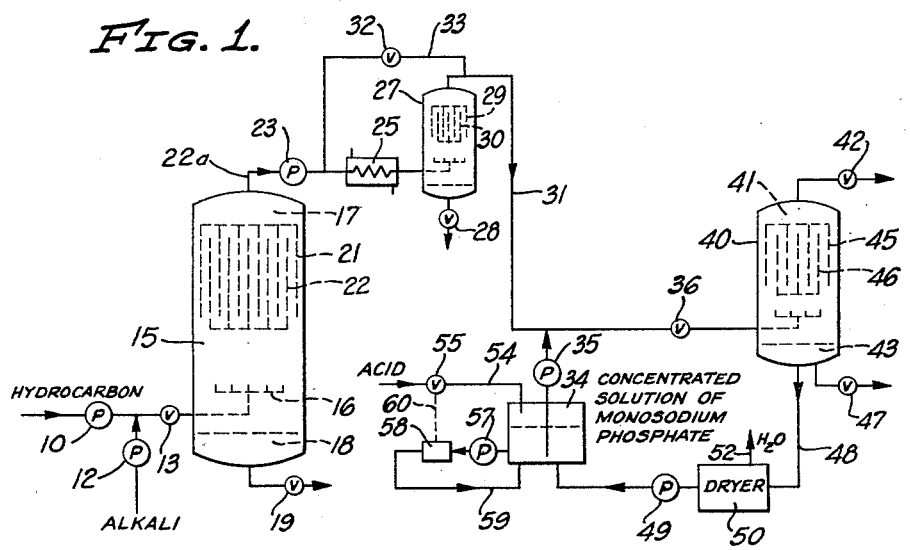

Jan. 1, 1963 R. W. STENZEL 3,071,541
METHOD AND APPARATUS FOR TREATING PETROLEUM PRODUCTS
Filed May 23, 1960

INVENTOR
RICHARD W. STENZEL
BY HIS ATTORNEYS
HARRIS, KIECH, RUSSELL & KERN 3,071,541
METHOD AND APPARATUS FOR TREATING
PETROLEUM PRODUCTS
Richard W. Stenzel, Palos Verdes Estates, Calif., assignor to Petrolite Corporation, Wilmington, Del., a corporation of Delaware
Filed May 23, 1960, Ser. No. 31,197
7 Claims. (Cl. 208—188)

My invention relates to the treatment of petroleum products to prevent hazing thereof upon cooling or standing; also to the removal of hazes or minute aqueous suspended particles already present therein. More specifically, it relates to the treatment of petroleum fractions containing no more than a few tenths of a percent of water in dissolved or dispersed state by mixing therewith a concentrated phosphate solution, monosodium phosphate being the preferred desiccating agent.

Petroleum products as produced in refinery distillation processes are commonly saturated with dissolved water and, in many instances, carry small amounts of dispersed water as well. This latter can sometimes be settled out in tanks but at other times exists in the form of a haze which resists separation by such means. My invention provides a process and means for removing such small amounts of dispersed water existing in haze form.

Even when no dispersed water or haze is present, it is often desirable to remove some or all of the dissolved water for various reasons, e.g. distillates are usually cooled by refinery plant water which in the summertime may have a temperature as high as 80° F. so that the final temperature of the oil will be in that general neighborhood. If the oil is subsequently brought to lower temperatures, such as by changes in atmospheric conditions or by shipment to cooler climates, some of the dissolved water will come out of solution and form a haze. This is undesirable from numerous standpoints, technical as well as commercial. One of the objects of the present invention is to remove small amounts of dispersed as well as appreciable amounts of dissolved water from hydrocarbon streams.

In the chemical refining of petroleum products it is common to mix an aqueous acid or alkaline reagent with the oil and separate the mixture into two or more phases. Even with the most efficient separation commercially possible, the supernatant oil phase usually contains at least traces of water. So long as the amount thereof does not exceed that which can be dissolved in the oil there is usually little or no haze problem. If larger amounts are present or if certain haze-free oils are cooled in storage or transit, troublesome aqueous precipitants appear, resulting in hazes which cloud an otherwise clear product or resulting in precipitation of minute particles of aqueous material that will not readily settle out.

The alkali refining of petroleum fractions is a typical example. Caustic alkali solutions mixed with such fractions can be separated by gravitational or electric methods but the resulting oil may still contain from a trace up to a few thousandths or a few hundredths of a percent of residual aqueous material containing salts or soaps that have resulted from the reaction of the alkali with the naphthenic or other organic acids of the oil. Even when such purified petroleum fractions are bright and clear, upon standing or when cooled many of them will develop an objectionable haze.

It has now been discovered that concentrated solutions of monosodium phosphate ($NaH_2PO_4$) mixed with such petroleum fractions and separated therefrom will take up the small amounts of aqueous material present and give other beneficial results.

It is an object of the inveniton to mix with a petroleum oil containing no more than a few tenths of a percent of dissolved or dispersed aqueous material a concentrated solution of monosodium phosphate and to separate the latter to produce an oil containing a greatly reduced amount of residual aqueous material. A further object is to prevent haze formation in petroleum fractions by such a process.

It has been found that improved separation of the mixtures thus produced can be effected by subjecting them to the action of a high-voltage electric field, particularly in those instances where gravity settling alone is too slow. It is an object of the invention to subject such mixtures to such an electric field to aid in the separation of the phosphate solution and the contaminants of the oil that have become associated therewith.

The problem solved by this invention is quite distinct from previous proposals to break or resolve water-oil emulsions of relatively high water content by adding a demulsifying agent to destabilize the interfaces and facilitate coalescence of dispersed water droplets when the emulsion is subjected to controlled turbulence. While phosphates other than monosodium phosphate have been proposed, among the thousands of demulsifying agents suggested for such processes, the functions and amounts used are distinctly different as compared with the teachings of the present invention, which is concerned with the desiccating action of particular phosphates.

While it has previously been proposed to remove traces of water from oils by use of desiccating agents other than herein disclosed, e.g. use of solid desiccants such as calcium chloride, silica gel, fuller's earth, etc., or solutions of sodium chloride, calcium chloride and lithium chloride, these materials have not proved to be fully satisfactory in commercial operations. Not only are they limited in the amount of water they can take up but the problem of continuously regenerating the desiccant to remove the collected water preparatory to reuse has presented serious problems. In addition, previous desiccants have in many instances deteriorated the product as by inducing discoloration, imparting corrosive properties to the oil or interfering with equipment in which the resulting product is to be used.

The use of monosodium phosphate is uniquely suited to the purposes of the present invention. This material has considerably greater water solubility than the salt solutions previously proposed and it is capable of substantially greater absorption of water from the oil. It is not corrosive to ordinary metals used in tanks or burning equipment even though the concentrated solutions are slightly acidic. It is relatively inexpensive and can readily be regenerated for reuse. It forms an aqueous phase that can be cleanly separated without formation of sludges or retention of oily materials in solution that would be undesirable because they would interfere with the regeneration process. Finally, it forms a mixture that is well adapted to the use of an electric field to resolve it, making possible the use of quite small-sized electrical equipment.

The monosodium phosphate of the invention is of particular value in treating those fractions that contain residual salts or soaps, e.g., as a result of alkali treatment of an oil containing organic acids. The concentrated solutions involved in the use of the invention are of relatively low pH, usually about 3.5–4, and are antagonistic to the emulsification tendencies of residual soaps in the oil. The low pH of the solution tends to remove metal ions present in the oil in the form of salts or soaps. The acid tends to disassociate such salts or soaps, liberating the organic acid radical, which remains in the oil, the sodium becoming associated with the aqueous material.

However, soaps or caustic in the oil tend to neutralize the acidic monosodium phosphate and convert it to disodium phosphate. The latter is greatly inferior as a desiccating agent and also less soluble so that if formed it would cause precipitation in the solution. It is desirable for most effective operation to fortify the reused solution by adding enough phosphoric acid to maintain the pH of the recirculated solution at about 3–5, preferably about pH 3.5–4, or within such range that substantially all the phosphate is present as monosodium phosphate rather than as the disodium salt.

In some cases, especially those in which the oil contains some alkaline materials in solution or suspension, it is desirable to add some free phosphoric acid to the monosodium salt in order to avoid the formation of disodium phosphate and thus risk the possibility of forming a precipitate of the disodium salt which would promote emulsification and, therefore, interfere seriously with the drying process. Thus in some cases the pH of the salt solution may be carried at about 3, provided the increased acidity does not harm the quality of the oil which is being treated. Normally a slight amount of free phosphoric acid is desirable in the monosodium phosphate solution even in the treatment of neutral distillates.

Figure 2:
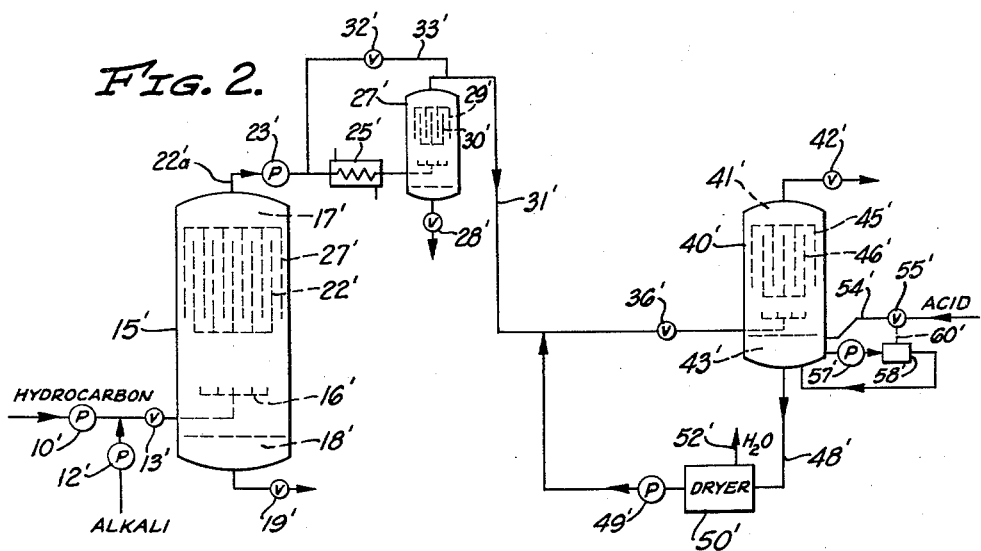

Apparatus by which the process can be advantageously performed is shown as a pipeline diagram in FIG. 1 of the attached drawing. FIG. 2 is a similar pipeline diagram illustrating alternative apparatus.

In FIG. 1 the invention is shown as applied to a typical process for the alkali treating of a hydrocarbon fraction. The hydrocarbon is pressured by a pump 10 before meeting a proportioned stream of an aqueous alkali solution pressured by a pump 12. The comingled materials advance through a valve 13 or other mixing device to a separator 15, being therein subdivided into a plurality of smaller streams by a multi-orifice distributor 16. In many instances gravitational action alone is sufficient to separate the mixture into a body of treated oil 17 in the upper portion of the separator and a body of separated aqueous material 18 in the lower portion thereof, the latter material being withdrawn periodically or continuously through a valve 19. If desired, sets of internested electrodes 21 and 22 may be suitably supported within the separator and energized by a high-voltage D.C. source, not shown, to coalesce the aqueous material into masses which will more readily separate by gravity from the oil.

The treated oil is withdrawn from the top of the separator 15 through a line 22a and is pressured by a pump 23 to advance through the subsequent equipment. This treated oil contains objectionable amounts of residual aqueous material either in dissolved or dispersed state. Even if this residual material is entirely in dissolved state it is often troublesome in producing the aforesaid hazes when cooled. The subsequent portion of the equipment is designed to remove hazes already present or to remove dissolved water tending to produce such hazes when the oil is cooled or permitted to stand.

If the effluent oil from the separator 15 is at elevated temperature it is often desirable to cool it in a cooler 25 to precipitate some of the dissolved water. The resulting suspension or dispersion can be delivered to another separator 27 in which some of the suspended aqueous droplets may settle to be withdrawn through a valve 28. Such separation is substantially bettered if high-voltage electric fields are established in the separator by use of internested electrode sets 29 and 30. However, it is not the function of the separator 27 to produce a haze-free oil nor necessarily to remove completely the suspended aqueous material. The oil effluent from this separator, advancing along the line 31, may still contain up to a tenth of a percent of aqueous material in dissolved or dispersed state. The cooler 25 and the separator 27 are usually by-passed by opening a valve 32 in a by-pass line 33 if the effluent from the separator 15 is substantially at atmospheric temperature or thereabout. In such instance the pressured dispersion in the line 31 is that which is withdrawn directly from the upper portion of the separator 15.

In accordance with the invention a concentrated solution of monosodium phosphate (containing a small amount of phosphoric acid if desired) is withdrawn from a tank 34 by a pump 35 and introduced into the line 31 to mingle with this oil. A mixing device 36 of any suitable type, shown as a valve in the line 31, intimately mixes these materials and disperses the concentrated salt solution as small drops throughout the oil. The hygroscopic or desiccating nature of these drops causes them to take up both dissolved and dispersed aqueous material from the oil either as a result of mixing or the coalescing-separating action which takes place in a separator 40 to which the mixture is delivered.

In the separator 40 the mixture separates into an oil phase containing no dispersed aqueous phase and dissolved water in concentration lower than the solubility of water in the oil at the existing temperature, this oil phase collecting as a body of finished oil 41 from which such oil can be continuously withdrawn through a valve 42, and a body of separated aqueous material 43 now containing the water absorbed from the oil. The material entering the separator 40 is well suited to resolution by electric fields and it is often desirable to position internested sets of electrodes 45 and 46 in the oil zone of the separator 40 to induce coalescence and growth of the aqueous material into masses which more easily settle from the oil to the body 43.

Aqueous material may be withdrawn from the body 43 through a valve 47 and discarded. However it is distinctly preferable to regenerate the salt solution and reuse it in the proces. In this instance the aqueous material is withdrawn through a line 48 by a pump 49 and delivered to the container 34. Any suitable drying means 50 is imposed in the line 48 upstream or downstream from the pump to evaporate or otherwise remove from the aqueous material an amount of water substantially equal to that taken up from the oil, this water being removed from the system as indicated by the arrow 52.

In the event that the monosodium phosphate has been in part converted to disodium phosphate in the process, it is desirable also to convert the latter to the monosodium form by adding to the container 34 a suitable amount of acid through a line 54 under the control of a valve 55. Phosphoric acid is preferred. In exacting installations it is desirable to control carefully the amount of such acid to maintain the pH of the monosodium phosphate solution in the container 34 at a value between about pH 3 and about pH 5, preferably in the range of about pH 3.5–4. Phosphate solutions of this pH range are preferred in the process. FIG. 1 shows diagrammatically a pH control system in which a pump 57 withdraws a minute sample stream from the container 34, passes it through a pH controller 58 and returns it to the container through a line 59. The pH controller includes pH-sensing means connected, as indicated by the dotted line 60, to control the valve 55. There is thus delivered to the container 34 either continuously or periodically enough phosphoric acid to maintain the pH of the solution in the tank within the range indicated.

In the equipment of FIG. 2, in which corresponding elements of the FIG. 1 embodiment are indicated by primed numerals, the actions are quite similar. However, the lower portion of the separator 40' is here relied upon as the storage for the concentrated solution of monosodium phosphate. This eliminates the need of a separate tank 34. In addition, the small amounts of acid supplied through the line 54' as controlled by the valve 55' maintain the entire body of aqueous material 43' within the above pH range. This further benefits the clean separation which is desirable in the separator 40'' since the danger of precipitate formation in this vessel is thus avoided.

The concentration of the salt solution proportioned into the system by the pump 35 or 35' is desirably high. Nearly saturated aqueous solutions are preferred where the greatest water removal is desired, but concentrations ranging from saturation to about 50% of saturation are usable in the process. The amount of phosphate (plus phosphoric acid) that can be dissolved in water depends upon the temperature and the pH of the solution. When operating in the lower pH ranges described, appreciable amounts of phosphoric acid are added to the system, thus increasing its ion content and its ability to draw water out of the oil.

The volumetric ratio of salt solution to petroleum fraction is not critical and will depend upon the amount of residual water to be taken up from the hydrocarbon and the amount of alkali therein. About 1–20% by volume will usually be used. The ratios are desirably selected to avoid too much dilution of the phosphate solution or too much conversion thereof to the disodium form if the hydrocarbon is alkaline.

It is desirable to avoid or minimize contact with air between the separators 15 and 40. In addition, it is of course desirable to minimize the amount of residual moisture in the hydrocarbon that is to be treated, so as to reduce the load on the process. However, hydrocarbons containing from a mere trace of water up to about .2% of moisture have been successfully treated by the process.

As an example of the process, a kerosine containing about 0.1% of moisture, partially dissolved and partially present as a haze, was intimately mixed with about 5% of a saturated aqueous solution of monosodium phosphate having a pH of about 3.5. This mixture was settled and produced a supernatant oil which was clear and formed no haze when its temperature was reduced by 30° F. Separation was accelerated and bettered by subjecting the mixture to an electrostatic field between electrodes energized from a source of unidirectional potential the gradient being about 9–10 kv./in.

In another example, a diesel oil was mixed with about 2% of 8° Bé. sodium hydroxide, the mixture being resolved in the separator 15 at about 160° F. with the aid of D.C. fields between the electrode sets 21 and 22 of about 6 kv./in. The resulting oil was clear but contained considerable haze when cooled to atmospheric temperature due to the decrease in solubility of the water in the oil. When this oil was cooled to atmospheric temperature and mixed intimately with 10% saturated monosodium phosphate solution the mixture separated by gravity into a finished oil that was clear and which remained so even when cooled 30° F. below atmospheric temperature.

To test the process of the invention under extreme conditions, a similar alkali-treated diesel oil containing .2% dissolved and dispersed moisture, an exceptionally large amount, was cooled to 80° F. and mixed intimately with only 1% of saturated monosodium phosphate solution having a pH of about 3.5. Separation gave a bright oil containing only 40 p.p.m. of water, and remained bright on cooling 35° F. below its treating temperature of 80° F.

Various changes can be made without departing from the spirit of the invention as defined in the appended claims.

I claim as my invention:

1. A process for the haze treatment of petroleum oils to remove therefrom aqueous material present therein in dissolved or dispersed state in small amounts not exceeding a few tenths of a percent, which process includes the steps of: intimately mixing with such petroleum oil about 1–20% of a concentrated aqueous solution of monosodium phosphate having a pH between about 3 and 5; and separating the mixture into an aqueous phase and an oil phase containing only minute amounts of aqueous material all dissolved therein.

2. A process as defined in claim 1 including the steps of regenerating said separated aqueous phase by removing therefrom an amount of water substantially equal to the amount of aqueous material taken up thereby from the petroleum oil, adjusting the pH of the regenerated separated aqueous phase to a value between about 3 and 5; and using the resulting regenerated separated aqueous phase as the concentrated aqueous solution of monosodium phosphate mixed with additional portions of said petroleum oil.

3. A process as defined in claim 2 in which said regeneration includes also the step of adding sufficient phosphoric acid to said separated aqueous phase to maintain the pH thereof between about 3 and 5 before mixing the regenerated aqueous phase with such additional portions of said petroleum oil.

4. A process for the alkali treatment of petroleum oils containing organic acids, which process includes the steps of: mixing with such petroleum oil sufficient aqueous alkaline solution to react with said organic acids to produce soaps; separating from the mixture an aqueous material containing most of said soaps leaving a separated oil containing a haze-forming small amount of aqueous material; haze-treating the separated oil by intimately mixing with said separated oil about 1–20% of concentrated aqueous solution of monosodium phosphate of a pH of about 3–5 to absorb the aqueous material therein; and separating the mixture into a separated aqueous phase and an oil phase containing only minute amounts of said aqueous material all dissolved therein.

5. A process as defined in claim 4, in which said monosodium phosphate splits a portion of the residual soaps in said treated oil, such splitting tending to convert said monosodium phosphate into disodium phosphate, and including the steps of regenerating said separated aqueous phase by removing therefrom an amount of water substantially equal to the amount of aqueous material taken up thereby from the petroleum oil and adding to the separated aqueous phase sufficient phosphoric acid to maintain the pH thereof between about 3–5, and using the regenerated separated aqueous phase as the concentrated aqueous solution of monosodium phosphate mixed with additional portions of said separated oil containing residual soaps.

6. A process as defined in claim 5 in which said mixture is separated at a temperature above 100° F., and including the step of cooling said separated oil to a lower temperature before mixing said monosodium phosphate solution therewith.

7. A process as defined in claim 6 in which said cooling of said separated oil precipitates some of its moisture, and including the step of removing at least a part of said precipitated moisture from the cooled separated oil before mixing said monosodium phosphate solution therewith.

References Cited in the file of this patent

UNITED STATES PATENTS

| | | |
|---|---|---|
| 1,661,731 | Meston | Mar. 6, 1928 |
| 1,788,911 | Clark | Jan. 13, 1931 |
| 2,119,240 | Lyons | May 31, 1938 |
| 2,271,882 | Ambler | Feb. 3, 1942 |
| 2,318,582 | Berger | May 11, 1943 |